(12) United States Patent
Moeller et al.

(10) Patent No.: US 11,561,420 B2
(45) Date of Patent: Jan. 24, 2023

(54) DISPLAY DEVICE HAVING A VARIABLE THICKNESS COVERING

(71) Applicant: Continental Automotive GmbH, Hannover (DE)

(72) Inventors: Jochen Moeller, Darmstadt (DE); Thomas Kaeppeler, Neu-Isenburg (DE); Humberto Gonzalez, Rochester, MI (US)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/518,235

(22) PCT Filed: Oct. 5, 2015

(86) PCT No.: PCT/EP2015/072956
§ 371 (c)(1),
(2) Date: Apr. 10, 2017

(87) PCT Pub. No.: WO2016/055420
PCT Pub. Date: Apr. 14, 2016

(65) Prior Publication Data
US 2017/0307909 A1  Oct. 26, 2017

(30) Foreign Application Priority Data
Oct. 8, 2014 (DE) .......................... 102014220348.1

(51) Int. Cl.
*G02F 1/00* (2006.01)
*B60K 35/00* (2006.01)
(Continued)

(52) U.S. Cl.
CPC ............ *G02F 1/0018* (2013.01); *B60K 35/00* (2013.01); *B60K 37/02* (2013.01); *G02F 1/1335* (2013.01);
(Continued)

(58) Field of Classification Search
CPC combination set(s) only.
See application file for complete search history.

(56) References Cited

U.S. PATENT DOCUMENTS 8,302,553 B2   11/2012   Fournier
9,955,602 B2    4/2018   Wildner et al.
(Continued)

FOREIGN PATENT DOCUMENTS

CN   102007434 A    4/2011
DE   19623881 A1   12/1997
(Continued)

OTHER PUBLICATIONS

International Search Report and Written Opinion dated Mar. 2, 2016 from corresponding International Patent Application No. PCT/EP2015/072956.
(Continued)

*Primary Examiner* — Lauren Nguyen

(57) ABSTRACT

The invention relates to a display device comprising a display plane, on which one or more planar display regions 10, 11 are arranged, said planar regions 10, 11 being covered by transparent coverings. A single transparent covering 3 covers all the planar display regions 10, 11 of the display device, is formed three-dimensionally on the viewer's side by regions of differing thicknesses and is connected on the side facing away from the viewer to the planar display regions 10, 11 by means of optical bonding. The refractive index of the material of the covering 3 corresponds to the refractive index of the optical-bonding material 8.

16 Claims, 3 Drawing Sheets

(51) Int. Cl.
*B60K 37/02* (2006.01)
*G02F 1/1335* (2006.01)
*G02F 1/1337* (2006.01)
*G02F 1/015* (2006.01)
*G02F 1/1347* (2006.01)

(52) U.S. Cl.
CPC .. *G02F 1/133711* (2013.01); *B60K 2370/154* (2019.05); *B60K 2370/1531* (2019.05); *B60K 2370/18* (2019.05); *B60K 2370/191* (2019.05); *B60K 2370/27* (2019.05); *B60K 2370/339* (2019.05); *B60K 2370/34* (2019.05); *B60K 2370/68* (2019.05); *B60K 2370/693* (2019.05); *G02F 1/0151* (2021.01); *G02F 1/13471* (2013.01)

(56) References Cited

U.S. PATENT DOCUMENTS

| | | | |
|---|---|---|---|
| 2008/0278803 A1* | 11/2008 | Kraus | B60K 35/00 359/440 |
| 2009/0078190 A1* | 3/2009 | Fournier | G01D 13/04 116/286 |
| 2011/0128470 A1 | 6/2011 | Yorita et al. | |
| 2012/0250280 A1* | 10/2012 | Sano | B60K 35/00 361/760 |
| 2012/0287664 A1 | 11/2012 | Coser et al. | |
| 2013/0242230 A1* | 9/2013 | Watanabe | G02F 1/133504 349/64 |
| 2014/0071653 A1 | 3/2014 | Thompson et al. | |

FOREIGN PATENT DOCUMENTS

| | | |
|---|---|---|
| DE | 19910241 A1 | 9/2000 |
| DE | 102005036009 A1 | 2/2007 |
| DE | 102008001508 A1 | 11/2008 |
| DE | 102009048284 A1 | 4/2011 |
| DE | 102009058141 A1 | 6/2011 |
| DE | 102012004635 A1 | 9/2013 |
| DE | 102012224352 A1 | 6/2014 |
| EP | 2456634 B1 | 3/2014 |
| GB | 2284699 A | 6/1995 |
| JP | 2010197236 A | 9/2010 |

OTHER PUBLICATIONS

Search Report dated Jun. 17, 2015 in corresponding DE App. No. 102014220348.1.
Office Action dated Jul. 19, 2022 from corresponding German patent application No. 10 2014 220 348.1.

* cited by examiner

DISPLAY DEVICE HAVING A VARIABLE THICKNESS COVERING

The invention relates to a display device having a display plane, in which one or more planar display regions are arranged, said display regions being covered by transparent coverings.

In display devices of this type, an observer can see the display regions in one plane.

It is an object of the invention to provide a display device of the type mentioned in the introductory part having a simple construction, in which, to an observer, the display regions appear to lie in different planes.

This object is achieved according to the invention by way of a single transparent covering covering all planar display regions of the display device and being three-dimensionally configured, on its observer side, having regions of various thicknesses, and being connected, by its side which faces away from the observer side, to the planar display regions using optical bonding, with the refractive index of the material of the covering corresponding to the refractive index of the optical bonding material.

Due to this configuration, an air gap between the planar display regions and the transparent covering is avoided, with the result that light is not diffracted between these components. The result of this is that the image plane of the planar display regions is optically perceived by the observer as being elevated toward the observer in the regions of greater thickness with respect to the regions of lower thickness, with the result that the various image planes give a three-dimensional impression to the observer. Optical elevation is by approximately a third of the respective thickness of the covering.

However, the observer can also perceive the optically differently elevated regions haptically by the surface structure of the covering.

Since the transparent covering completely covers the display plane, a seamless surface of the covering over the display plane is achieved and optical disturbances due to separating gaps are avoided.

The planar display regions can be formed by digits and/or characters and/or symbols, which are provided on a carrier plate, wherein the planar display regions can be one or more dials which can have scales.

Such display devices are advantageously usable in instrument clusters in vehicles.

The transparent covering and the carrier plate can here have through-openings which are associated with the scales and through which pointer spindles, which are drivable such that they can rotate and which have pointers on the observer side, are guided.

The planar display regions can also be formed by one or more optoelectronic displays.

Suitable optical displays are, for example, a wide variety of liquid-crystal displays.

For this purpose, the carrier plate can have, in a simple mountable fashion, a cutout which is covered by the planar display region of the electro-optical display.

The planar display regions are preferably arranged in a plane on the observer side.

Consequently, the side of the transparent covering facing away from the observer can also extend in a plane, which is easily producible and also results in a reliably air-gapless connection of the optical bonding material to the display regions.

An embodiment for the transparent covering which is easily producible is one in which the transparent covering is an injection-molded part.

Polymethyl methacrylate is a suitable material herefor.

Another embodiment of the transparent covering which is likewise easily producible is one in which the transparent covering has a thermoformed transparent film, with the depressions thereof being filled, on the side facing away from an observer, with optical bonding material.

The film can consist of a polycarbonate or can also be thermoformed glass.

In this embodiment, it is also possible to produce regions of particularly low thickness.

The optical bonding material here assumes a double function, in that it not only serves for connecting the transparent covering, but also constitutes the material of the transparent covering.

In order to create what is known as a "black-panel effect," it is possible for the transparent covering to be a tinted covering, with the result that an observer always only sees the respectively backlit display regions.

If the transparent covering is an injection-molded part, the tinted covering can be a corresponding coating of the injection-molded part.

Such an additional working step can be omitted if the transparent covering consists of a thermoformed transparent film made of tinted material, the depressions of which on the side facing away from an observer are filled with optical bonding material.

An exemplary embodiment of the invention is illustrated in the drawing and will be described in more detail below. In the figures.

Figure 1:
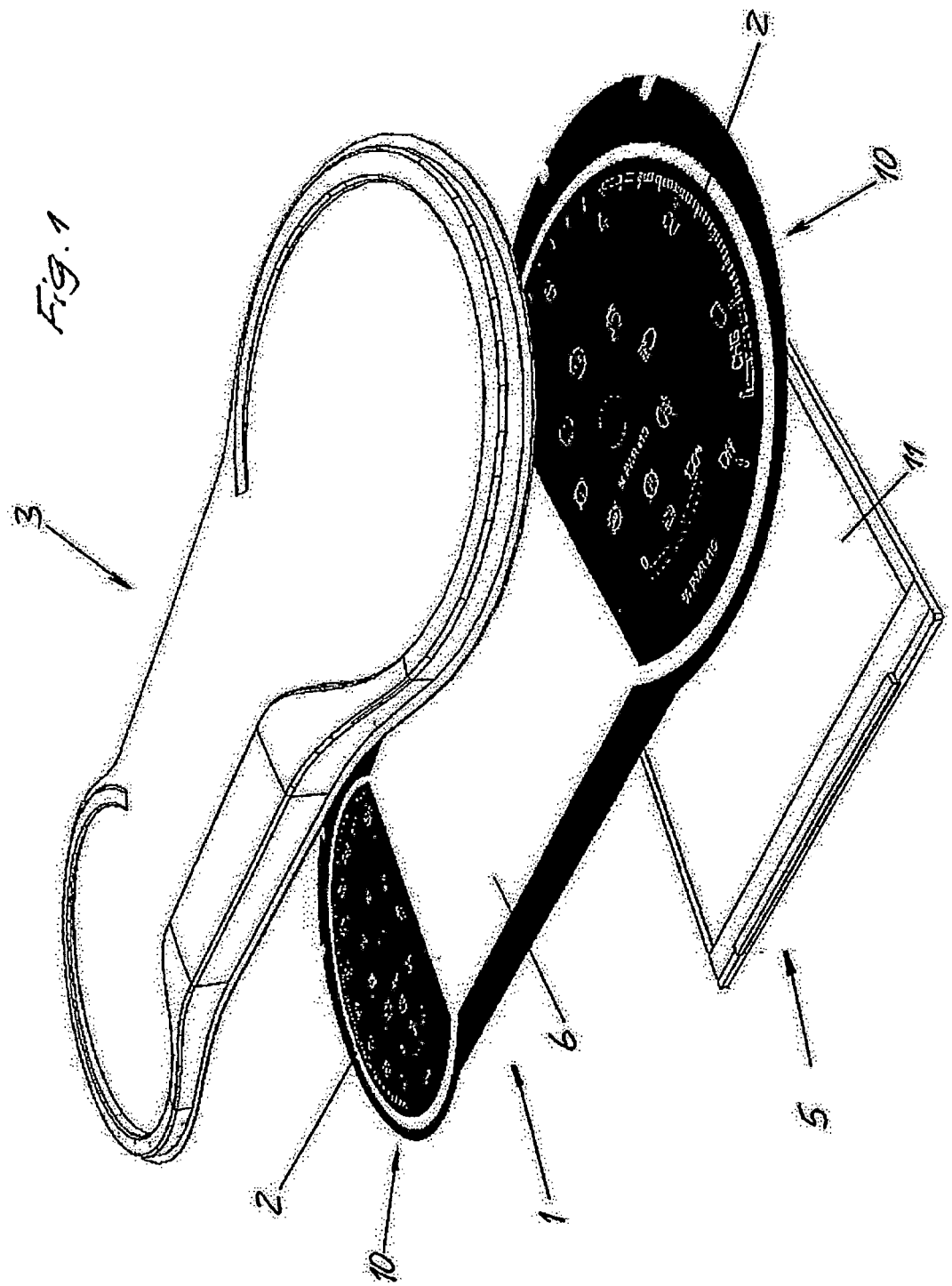
FIG. 1 shows a perspective exploded view of a display device.
Figure 2:
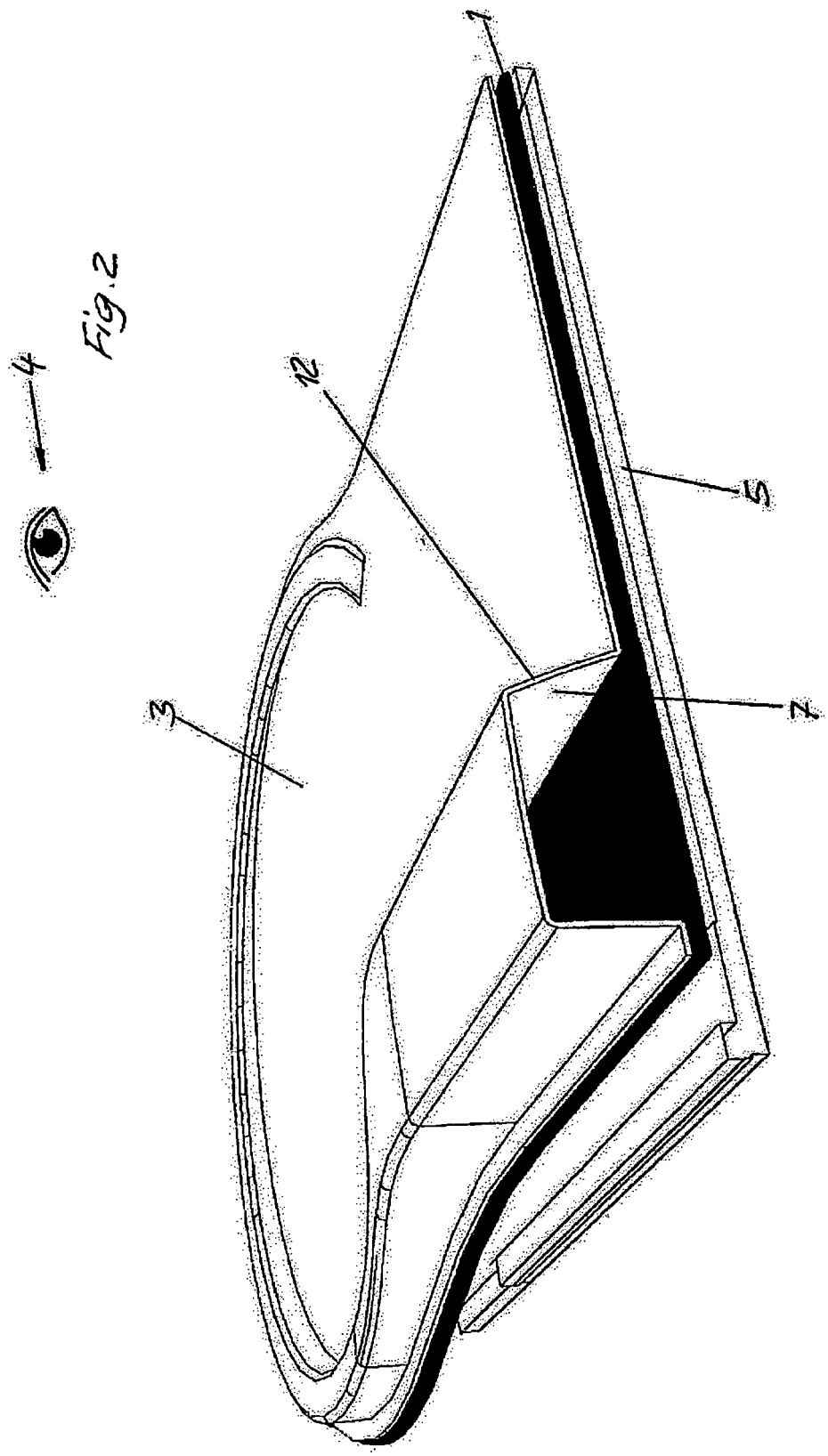
FIG. 2 shows a perspective illustration of the display device in cross section without optical bonding material.

The illustrated display device has a thin carrier plate 1, onto which two scales 2 for pointer instruments, which in the negative illustration form first display regions 10, are applied at a distance from one another, and further display symbols and bar graphs are applied within the scales 2.

The carrier plate can be configured in the form of a film.

Arranged on the observer side in front of the carrier plate 1 is a transparent covering 3, and on the side facing away from an observer 4, an optoelectronic display 5, such as for example a TFT display, is arranged.

The second display region 11 of the display 5 overlays a rectangular cutout 6 in the carrier plate 1.

The transparent covering 3 consists of a transparent plastics film 12, which was configured in three-dimensional form in a thermoforming process. Subsequently, the thermoformed plastics film 12 was positioned horizontally such that its side facing away from the observer 4 points up, and the depressions 7 of the plastics film 12 were filled with an optical bonding material 8, which is illustrated in a hatched manner in FIG. 3, and the entire surface of the transparent covering 3 was coated, on its side facing away from the observer 4, with the optical bonding material 8.

Next, the carrier plate 1 and the display 5 were placed onto the side of the transparent covering 3 facing away from the observer 4 such that the display regions 10 and 11 thereof point to the observer side and such that the carrier plate 1 and the display 5 are connected to the transparent covering 3 without air inclusions.

Since the refractive index of the material of the covering 3 at least substantially corresponds to the refractive index of the optical bonding material 8, light is not diffracted between these parts.

As a result, the image planes of the planar display regions 10, 11 of the carrier plate 1 and the display are optically perceived by the observer 4 as being elevated toward the observer 4 in the regions of greater thickness of the transparent covering 3 with respect to the regions of lower thickness, with the result that the different image planes 9, 13 give the observer 4 a three-dimensional impression. The optical elevation is by approximately a third of the respective thickness of the transparent covering 3.

Figure 3:
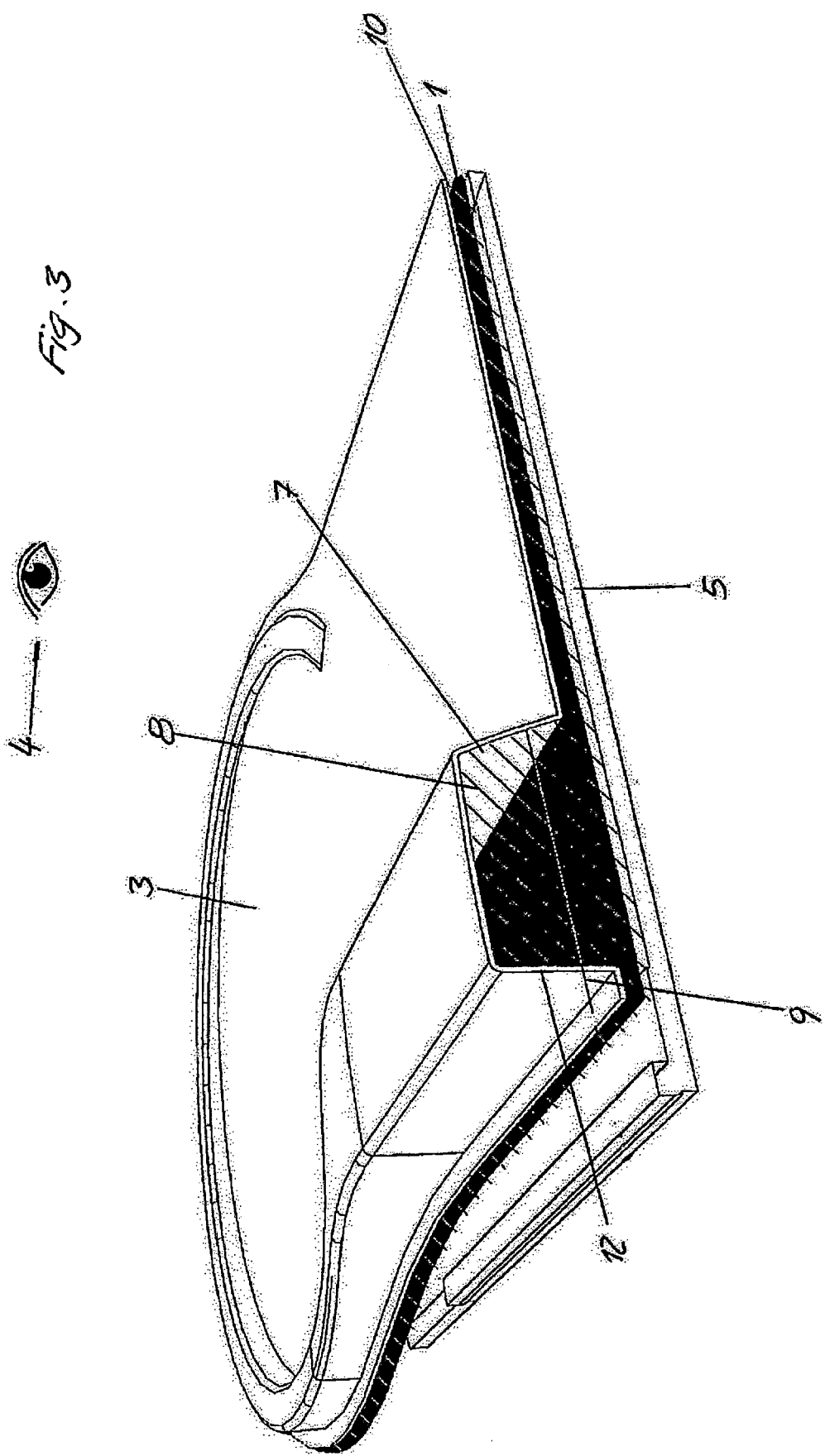
FIG. 3 shows a perspective illustration of the display device in cross section with optical bonding material.

As illustrated in FIG. 3, the image plane 9 is elevated in the region of the depression 7 in the central region of the covering 3 with respect to the image plane 10 in the region which has no depression.

Centrically with respect to the scales 2, through-openings (not illustrated) are formed in the carrier plate 1 and the transparent covering 3, through which pointer spindles can be guided onto which pointers may be placed in front of the transparent covering 3 on the observer side. The pointer spindles of swivel drives (likewise not illustrated), which may be arranged behind the carrier plate 1, are drivable such that they may swivel.

The plastics film 12 is a tinted plastics film, with the result that the covering 3 is a tinted covering and brings about a "black-panel effect." The display device has, on the side facing away from the observer 4, one or more light sources (not illustrated). Only the display regions 10, 11, which are backlit by the light sources, are visible for the observer 4.

The invention claimed is:

1. A display device comprising:
a display plane, in which one or more planar display regions are arranged, wherein the display regions are covered by transparent coverings,
a single transparent covering that covers all planar display regions of the display device and is three-dimensionally configured, on its observer side, having regions of various thicknesses, wherein the regions of various thicknesses are between at least one of the planar display regions and the observer side wherein the at least one display region is optically perceived as being elevated toward the observer side in the regions of greater thickness,
wherein the regions of various thickness are located linearly between at least one of digits, characters, symbols dials, pointers, and an optoelectronic display located on the display plane and an observer location, and
wherein the transparent covering is connected, by its side which faces away from the observer side, to the planar display regions using optical bonding, with the refractive index of the material of the covering corresponding to the refractive index of the optical bonding material.

2. The display device as claimed in claim 1, wherein the planar display regions are formed by at least one of digits, characters, and symbols, which are applied onto a carrier plate.

3. The display device as claimed in claim 2, wherein the planar display regions are one or more dials.

4. The display device as claimed in claim 2, wherein the planar display regions have scales.

5. The display device as claimed in claim 4, wherein the transparent covering and the carrier plate have through-openings which are associated with the scales and through which pointer spindles, which are drivable such that they can rotate and which have pointers on the observer side, are guided.

6. The display device as claimed in claim 1, wherein the planar display regions are formed by one or more optoelectronic displays.

7. The display device as claimed in claim 2, wherein the carrier plate has a cutout which is covered by the planar display region of the electro-optical display.

8. The display device as claimed in claim 1, wherein the planar display regions are arranged in one plane on the observer side.

9. The display device as claimed in claim 1, wherein the transparent covering is an injection-molded part.

10. The display device as claimed in claim 1, characterized in that the transparent covering (3) has a thermoformed transparent film (12), the depressions (7) of which on the side facing away from an observer (4) are filled with optical bonding material (8).

11. The display device as claimed in claim 1, wherein the transparent covering is a tinted covering.

12. A display device comprising:
at least one planar display regions arranged in a display plane;
a single transparent covering that covers all of the at least one planar display regions of the display device, wherein the covering is three-dimensionally having regions of various thicknesses;
wherein the regions of various thicknesses are in a position visible to an observer location such that a line of sight for an observer passes through the transparent covering when viewing the at least one planar display and the at least one display region is optically perceived by the observer as being elevated in the regions of greater thickness; and
wherein the regions of various thickness are located linearly between at least one of digits, characters, symbols dials, pointers, and an optoelectronic display located on the display plane and the observer location.

13. A display device comprising:
at least one planar display regions arranged in a display plane;
a single transparent covering that covers all of the at least one planar display regions of the display device, wherein the covering is three-dimensionally having regions of various thicknesses;
wherein the regions of various thicknesses are between the at least one planar display region and an observer location on the observer side of the transparent covering such that the at least one display region is optically perceived as being elevated toward the observer side in the regions of greater thickness; and
wherein the regions of various thickness are located in a line of sight between at least one of digits, characters, symbols dials, pointers, and an optoelectronic display located on the display plane and the observer location.

14. The display device as claimed in claim 1, further comprising a light source on an opposing side of the at least one display region from the observer.

15. The display device as claimed in claim 12, further comprising a light source on an opposing side of the at least one display region from the ob server.

16. The display device as claimed in claim 13, further comprising a light source on an opposing side of the at least one display region from the ob server.

* * * * *